United States Patent
Huang et al.

(10) Patent No.: US 12,050,153 B2
(45) Date of Patent: Jul. 30, 2024

(54) METHOD FOR MONITORING TRANSPORT VEHICLE AND MAINTENANCE THEREOF

(71) Applicant: TAIWAN SEMICONDUCTOR MANUFACTURING COMPANY LTD., Hsinchu (TW)

(72) Inventors: Chun-Jung Huang, Yunlin County (TW); Kuang Huan Hsu, Hsinchu (TW); Jen-Ti Wang, Taichung (TW); Po-Feng Tsai, Taipei (TW); An-Sheng Chung, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 156 days.

(21) Appl. No.: 17/098,070

(22) Filed: Nov. 13, 2020

(65) Prior Publication Data
US 2022/0155180 A1    May 19, 2022

(51) Int. Cl.
| | |
|---|---|
| *G01M 17/02* | (2006.01) |
| *B65G 43/02* | (2006.01) |
| *G06Q 10/20* | (2023.01) |
| *G06Q 50/04* | (2012.01) |
| *G07C 5/00* | (2006.01) |
| *G07C 5/08* | (2006.01) |

(52) U.S. Cl.
CPC ............ *G01M 17/02* (2013.01); *B65G 43/02* (2013.01); *G06Q 10/20* (2013.01); *G06Q 50/04* (2013.01); *G07C 5/006* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | | | |
|---|---|---|---|---|
| 2011/0245964 | A1* | 10/2011 | Sullivan ............ | H01L 21/68707 700/228 |
| 2011/0262004 | A1* | 10/2011 | Murakami .............. | B66C 13/48 382/103 |
| 2017/0084094 | A1* | 3/2017 | Worden ............... | G07C 5/0808 |
| 2019/0371636 | A1* | 12/2019 | Huang .............. | H01L 21/67276 |

FOREIGN PATENT DOCUMENTS

| | | | | |
|---|---|---|---|---|
| DE | 602004004246 T2 | * | 11/2007 | ............... B61K 9/02 |
| WO | WO-2018211251 A1 | * | 11/2018 | .............. G01B 11/30 |

* cited by examiner

*Primary Examiner* — Matthew G Marini
(74) *Attorney, Agent, or Firm* — WPAT LAW; Anthony King (57) ABSTRACT

A method for monitoring a transport vehicle is provided. The method includes the operations as follows. A transport vehicle is scanned by a monitor during the transport vehicle is operated on a rail to acquire a vehicle pattern of the transport vehicle. The vehicle pattern of the transport vehicle is analyzed. An abnormal transport vehicle is determined based on the vehicle pattern. The monitor is placed nearby the rail. A method for transport vehicle maintenance is also provided.

20 Claims, 9 Drawing Sheets

METHOD FOR MONITORING TRANSPORT VEHICLE AND MAINTENANCE THEREOF

BACKGROUND

In the manufacturing of a product, the product is usually processed at many work stations or processing machines. The transporting or conveying of partially-finished products, or work-in-process (WIP) parts, is an important aspect in the total manufacturing process. The careful conveying of semiconductor wafers is especially important in the manufacturing of integrated circuit chips due to the delicate nature of the chips. Furthermore, in fabricating an IC product, a multiplicity of fabrication steps, i.e., as many as several hundred, is usually required to complete the fabrication process. A semiconductor wafer or IC chip must be transported between various process stations in order to facilitate various fabrication processes.

BRIEF DESCRIPTION OF THE DRAWINGS

Aspects of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component region, layer or section from another. The terms such as "first", "second", and "third" when used herein do not imply a sequence or order unless clearly indicated by the context.

To complete the fabrication of an IC chip, various steps of deposition, cleaning, ion implantation, etching, and passivation must be carried out before an IC chip is packaged for shipment. Each of these fabrication steps must be performed in a different process machine, i.e., a chemical vapor deposition chamber, an ion implantation chamber, an etcher, etc. A partially processed semiconductor wafer must be conveyed between various work stations many times before the fabrication process is completed. The safe conveying and accurate tracking of such semiconductor wafers or work-in-process (WIP) parts in a semiconductor fabrication facility is therefore an important aspect of the total fabrication process.

Conventionally, partially finished semiconductor wafers or WIP parts are conveyed in a fabrication plant by automatically-guided vehicles (AGVs), rail-guided vehicles (RGVs), overhead transport vehicles (OHTs), or the like, that travel on predetermined rails, routes, or tracks. For the conveying of semiconductor wafers, the wafers are normally loaded into cassettes or SMIF (standardized mechanical interface) pods and then picked up and placed in the automatic conveying vehicles. For identifying and locating the various semiconductor wafers or WIP parts being transported, the cassettes or pods are normally labeled with a tag positioned on the side of the cassette or pod. The tags can be read automatically by a tag reader that is mounted on the guard rails of the conveying vehicle. The AGVs, RGVs, and OHTs normally transport the pods from bay to bay along an interbay loop, and eventually deliver the pods to a robotic storage house, or stocker, which automatically delivers the pods to an interbay loop.

Averagely, a transport vehicle, or be called as a transport carrier, may be used to transport the pods or cassettes more than about 365,000 times per year, while the moving distance each time may vary. Such usage not only includes the transportation between bays or work stations in the semiconductor manufacturing factory, but also includes the processes that carrying up/pick up and carrying-down/deposit the pods or cassettes at the bays or work stations, these processes could cause some device defect and shift and thus shorten or deplete the lifetime of the transport vehicles. For example, the surface of the transport vehicle may include scratches or cracks due to collisions, which may be seen as a particle source in the semiconductor manufacturing factory. The aged wheels of the transport vehicles may also have cracks and thus become another particle source in the semiconductor manufacturing factory. Furthermore, the roundness or the diameter of the wheels or the guide wheels may be changed after the long time usage due to the heavy load of the pods or cassettes. The positions of the grips of the transport vehicles may be changed due to the heavy load as well.

Malfunction of the transport vehicle may happen when the transport vehicle is traveling on the predetermined rails, routes, or tracks, and the working recipe for the transported semiconductor wafers or WIP parts may thus be failed, which may cause considerable damage and loss of production because the manufacturing process is interrupted accordingly. Therefore, it is necessary to reduce the fault probability and the present disclosure thus provides a method for monitoring transport vehicles which may substantially real-time predict the remaining lifetime of the transport vehicles and possible failure components thereof by three-dimensional moving feature capture and analysis when the transport vehicles are operating, for example, running on the a closed rail in the semiconductor manufacturing factory. Note the method in the present disclosure may be implemented in any automation manufacturing factory, and the semiconductor manufacturing factory is one of the examples but is not intended to be limiting.

Figure 1:
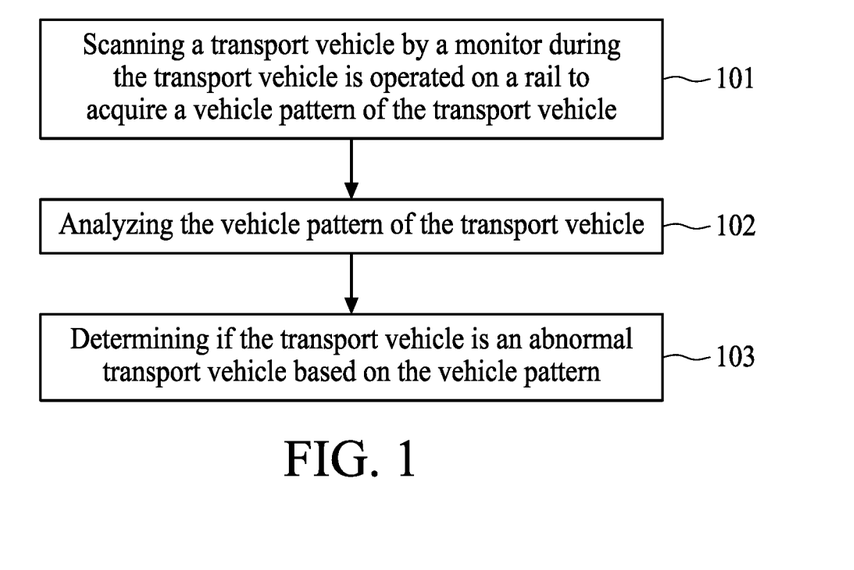
FIG. 1 illustrates a flow chart of monitoring transport vehicles according to some embodiments of the present disclosure.

FIG. 1 illustrates a flow chart of monitoring transport vehicles according to some embodiments of the present disclosure. In some embodiments, the method includes an operation 101: scanning a transport vehicle by a monitor during the transport vehicle is operated on a rail to acquire a vehicle pattern of the transport vehicle; an operation 102: analyzing the vehicle pattern of the transport vehicle; and an operation 103: determining if the transport vehicle is an abnormal transport vehicle based on the vehicle pattern. The monitor is placed nearby the rail.

In some embodiments, the transport vehicles are automatically-guided vehicles (AGVs) or overhead transport vehicles (OHTs) which are operated under an automated material handling system (AMHS). AMHS refers to a system that the management of material processing by use of automated machinery and electronic equipment. In addition to increasing the efficiency and speed by which materials are produced, shipped, stored, and handled, automated materials handling reduces the need for humans to do all of the work manually. Generally, AMHS may significantly cut down on costs, human error or injury, and lost hours when human workers need heavy tools to perform certain aspects of work or are unable to perform the work physically. Some examples of commonly used automated materials handling processes include robotics in manufacturing and toxic environments; computerized inventory systems; scanning, counting and sorting machinery; and shipping and receiving equipment. These resources allow humans to perform work faster, safer, and with less need for additional personnel to manage routine tasks and time-consuming aspects of producing goods from raw materials. The present disclosure uses the manufacturing process in the semiconductor manufacturing factory as examples, and thus the targets transported by AMHS are semiconductor wafers or WIP parts but are not intended to be limiting. In addition, the size and form of the transport vehicle are depending on the nature of transported objects and the design for the factory, for example, the size and weight of the transported objects in 150 mm, 200 mm, and 300 mm wafer fabrication facilities are different, and the present disclosure is not intended to be limiting regarding the size and form of the transport vehicle.

Figure 2:
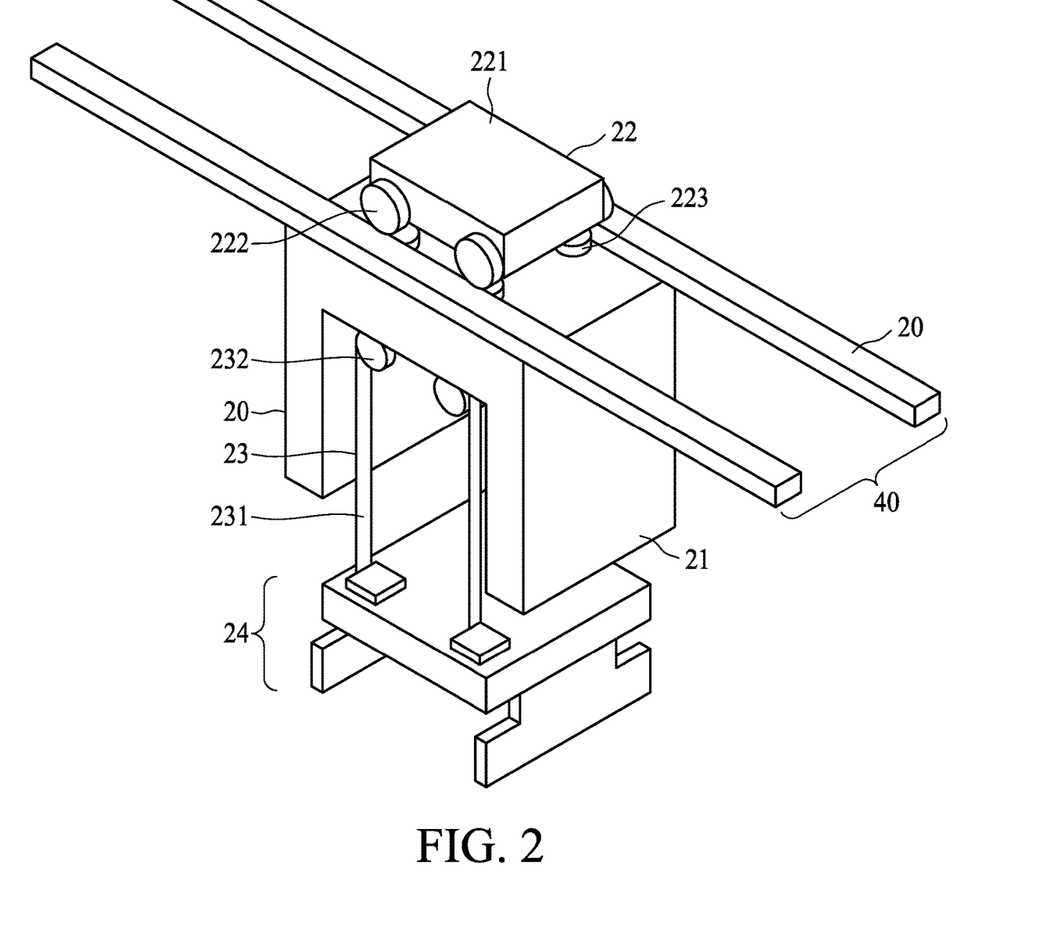
FIG. 2 depicts a schematic three dimensional illustration of a transport vehicle according to some embodiments of the present disclosure.

FIG. 2 depicts a transport vehicle according to some embodiments of the present disclosure. In some embodiments, the transport vehicle 20 includes a housing 21, a traveling member 22, a hoisting member 23 and a gripping member 24. In some embodiments, the traveling member 22 is disposed over the housing 21, and the hoisting member 23 and the gripping member 24 are disposed below and partially shielded by the housing 21.

To be more detailed, the traveling member 22 is configured to movably mount the transport vehicle 20 to the rail 40. In some embodiments, the traveling member 22 can be a wheeled trolley, which is configured to complement and cooperate with the rail 40 for rolling movement along the rail 40 not only laterally or horizontally but also travel along the rail smoothly, including to travel through the branches and merges of the rail. In some embodiments, the transport vehicle 20 is suspended on the rail 40 through the traveling member 22. In some embodiments, the traveling member 22 is installed on the rail 40 and connected to the housing 21. In some embodiments, the housing 21 is mounted on the traveling member 22. The traveling member 22 may include a traveling motor 221, one or more traveling wheels 222, and one or more guide wheels 223. The transport vehicle 20 may travel laterally upon rotation of the traveling wheel 222 of the traveling member 22. In some embodiments, the traveling motor 221 is configured to actuate the traveling wheels 222 such that the traveling wheels 222 can be rotated and the transport vehicle 20 can travel laterally along the rail 40.

In some embodiments, the housing 21 of the transport vehicle 20 can be a rigid frame surrounding several components, such as the hoisting member 23 and the gripping member 24. In some embodiments, the gripping member 24 is configured to grip at least one material unit for subsequent process. In some embodiments, the gripping member 24 may pick up the target, and then retract back to the transport vehicle 20. In some embodiments, the gripped target can be a wafer, WIP parts, a semiconductor substrate, a semiconductor structure or a package. In some embodiments, the gripped target includes semiconductor materials such as silicon and/or other suitable materials, in some embodiments, the gripped target includes circuitries or electrical components disposed on a semiconductor substrate. In some embodiments, the gripping member 24 is configured to securely hold and release the gripped target in order to transport such along the rail 40 from one location to another.

The hoisting member 23 is configured to lift and lower the gripped target from and to a load port of a process machine station using the gripping member 24. In some embodiments, when the hoisting member 23 is in a retracted status, the hoisting member 23 is disposed in and surrounded by the housing 21. In some embodiments, when the hoisting member 23 is in an extended status, the hoisting member 23 is disposed out of the housing 21. The hoisting member 23 is extendable from and, retractable toward the housing 21. In some embodiments, the hoisting member 13 connects the housing 21 to the gripping member 24. In some embodiments, the hoisting member 23 is extendable to move the gripping member 24 out of the housing 21 and retractable to move the gripping member 24 back to the housing 21. In some embodiments, the hoisting member 23 is telescopically extendable and retractable.

Accordingly, in a typical mode of operation, the target is transported by the transport vehicle 20 that travel along the rail 40 and stops at a position suitable for unloading the target into an input port of a bay or a work station or for loading another target from an output port of the bay or the work station. Further, another transport vehicle 20 may wait on the rail 40 until the aforesaid transport vehicle 20 finishes unloading or loading the objects and moves out of the way.

Moreover, in some embodiments, the hoisting member 23 includes a hoisting motor (not shown in the figure), a belt 231 and at least a hoist wheel 232 at least. The hoisting motor is configured to actuate the hoist wheel 232 such that the hoist wheel 232 can be rotated and the belt 233, which is connected to the hoist wheel 232, can be vertically extended from or retracted toward the hoist wheel 232. The hoisting member 23 can lower the gripping member 24 by extending the belt 233 from the housing 21. A top portion of the gripped target can then be held by the gripping member 24 and lifted from a load port of a processing machine station by retracting the belt 233 toward the housing 21. In some embodiments, when the belt 233 is in a retracted status, the hoisting member 23, the gripping unit 24 and the gripped target are disposed inside the housing 21. In some embodiments, the hoisting member 23 is in the retracted status upon movement of the transport vehicle 20 along the rail 40.

Generally, the rail 40 in the semiconductor manufacturing factory may be seen as a closed rail and the transport vehicle 20 may continuously travel within the closed rail for running process flow except the transport vehicle 20 is standing idle or malfunctioned. However, in the circumstances that the transport vehicle 20 is malfunctioned, it may be malfunctioned at the midway of the process flow, and such malfunctioned transport vehicle 20 may thus interrupt the running of the process flow. In such situation, the engineers may not restart the process flow before the malfunctioned transport vehicle 20 is removed from the closed rail for repairing, or is repaired in site. Accordingly, some of the embodiments of the present disclosure utilize the plurality of monitors to scan and analysis the vehicle patterns of the transport vehicles to identify an abnormal transport vehicle prior to the malfunction of the transport vehicle 20.

Figure 3A:
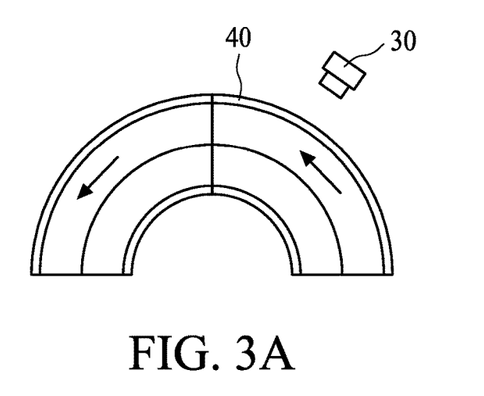
FIG. 3A illustrates a schematic top view of a monitoring system according to some embodiments of the present disclosure.
Figure 3B:
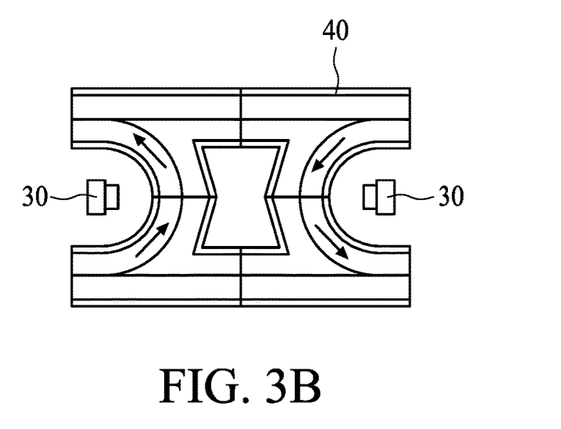
FIG. 3B illustrates a schematic top view of a monitoring system according to some embodiments of the present disclosure.
Figure 3C:
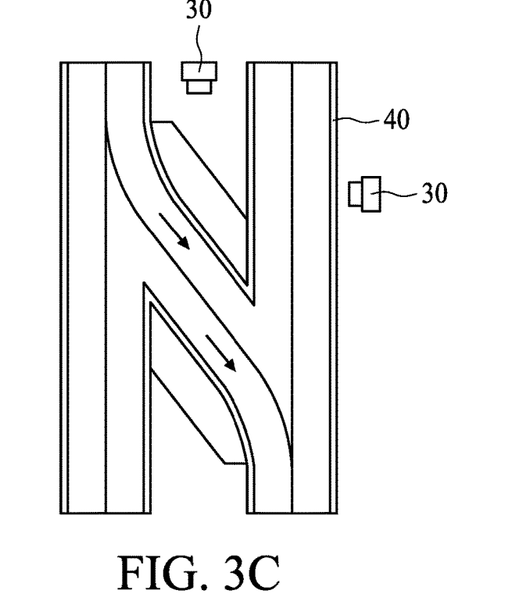
FIG. 3C illustrates a schematic top view of a monitoring system according to some embodiments of the present disclosure.
Figure 3D:
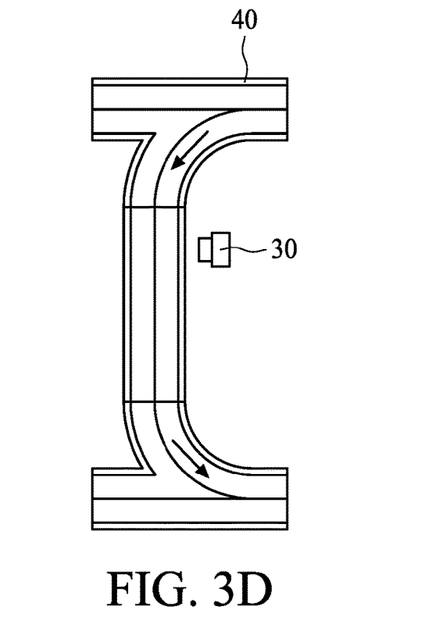
FIG. 3D illustrates a schematic top view of a monitoring system according to some embodiments of the present disclosure.

FIGS. 3A and 3D illustrate top schematic views of a monitoring system according to some embodiments of the present disclosure. As previously mentioned, the plurality of monitors 30 are placed nearby the rail 40. The monitors 30 are configured to monitor the exterior or appearance of the transport vehicles 20 automatically when they pass by the monitors 30. In some embodiments, the abnormal transport vehicle may be identified by scanning the appearance of each of the transport vehicles 20 to obtain the plurality of vehicle patterns of each of the transport vehicles 20 and analyzing the vehicle patterns of the transport vehicles 20. In some embodiments, the vehicle patterns at least includes a serial number, a main body profile, a tyre tread profile, a traveling wheel size, a guide wheel size, and a status of a gripping member of the transport vehicles 20. In some embodiments, more vehicle patterns may be included depending on the forms or the operation modes of the transport vehicles 20, for example, the serial number may be replaced with any recognizable marks.

Figure 4A:
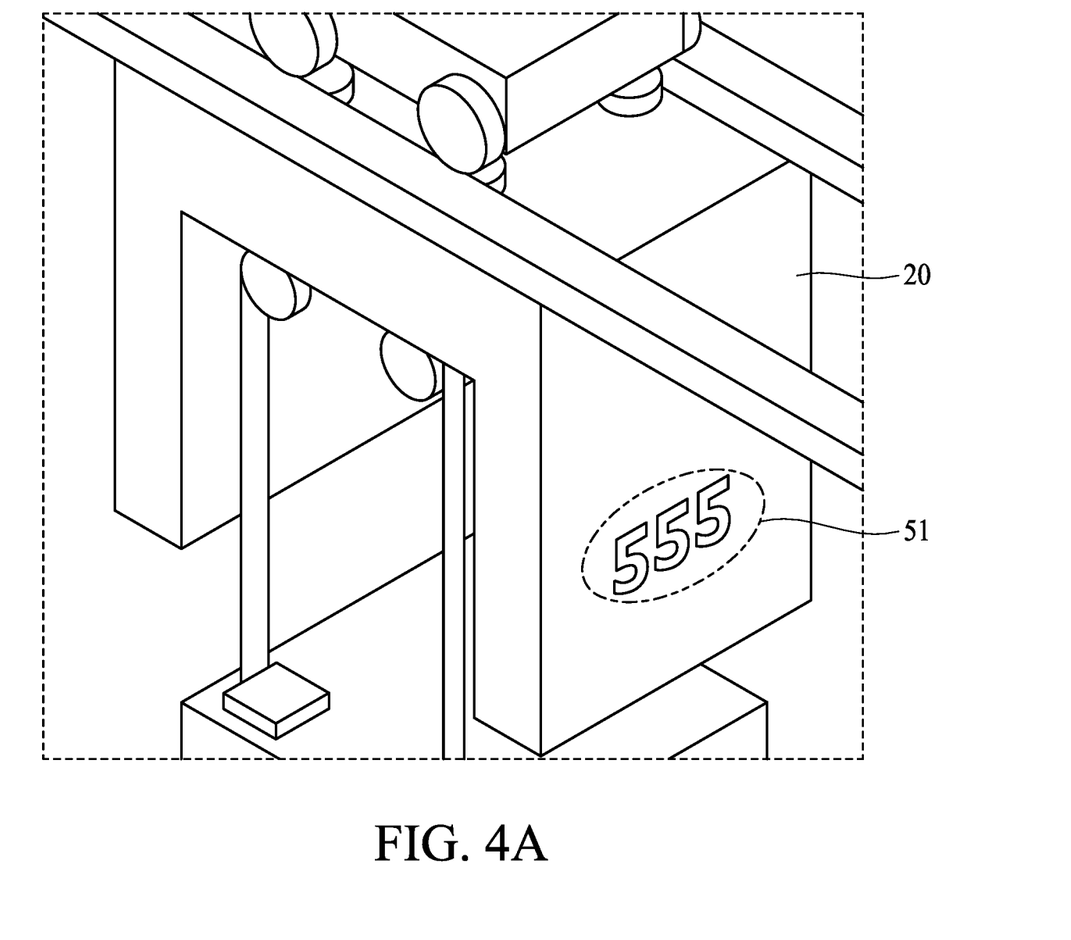
FIG. 4A illustrates a schematic view of a serial number of a transport vehicle according to some embodiments of the present disclosure.

As shown in FIG. 4A, the serial number 51 is used to identify which transport vehicle 20 is under monitoring, and therefore the operating statuses of each of the transport vehicles 20 may be monitored and tracked independently. For example, the operating status may include the information regarding the total hours that the transport vehicle 20 operated on the rail 40, the total distance that the transport vehicle 20 traveled on the rail 40, the accumulated weight that the transport vehicle 20 loaded during the operation period, the time since previous scheduled maintenance for the transport vehicle 20, etc. Such operating statuses are highly relevant to the remaining lifetime of the transport vehicles 20.

Conventionally, the transport vehicles 20 need to move out from the rail 40 for inspection regularly, for example, one time per year. The regular inspection is usually executed manually. However, the transport vehicle 20 moved out from the rail 40 maybe still in a good condition, or such transport vehicle 20 is slightly or partially malfunctioned or damaged but has been made negative effect to the process flow for a while. For example, the surface of the transport vehicle 20, particularly, the surface of the housing 21, may include scratches or cracks due to collisions, which may thus become a particle source in the semiconductor manufacturing factory and not being aware until the regular inspection or scheduled maintenance.

Figure 4B:
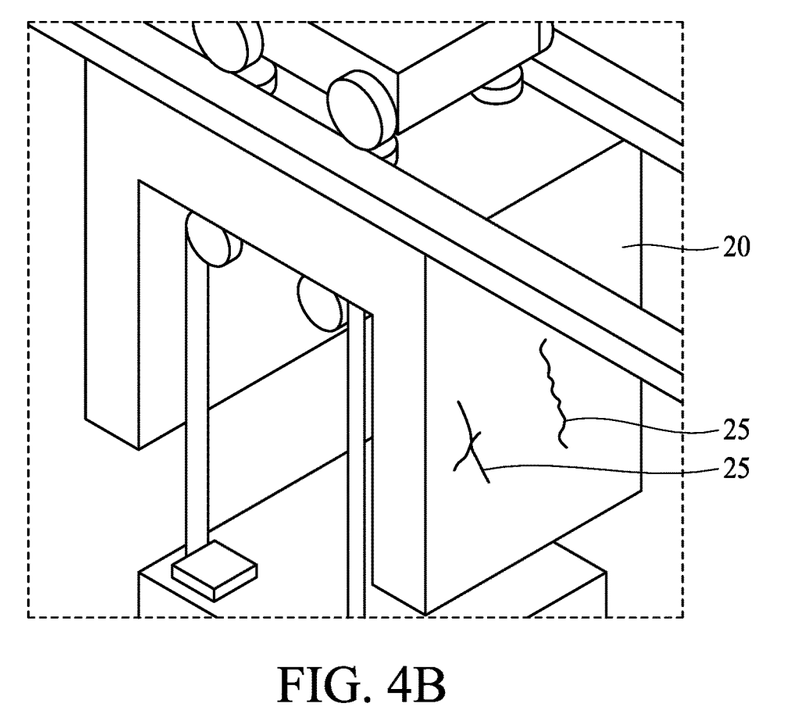
FIG. 4B illustrates a schematic view of a housing of a transport vehicle according to some embodiments of the present disclosure.
Figure 4C:
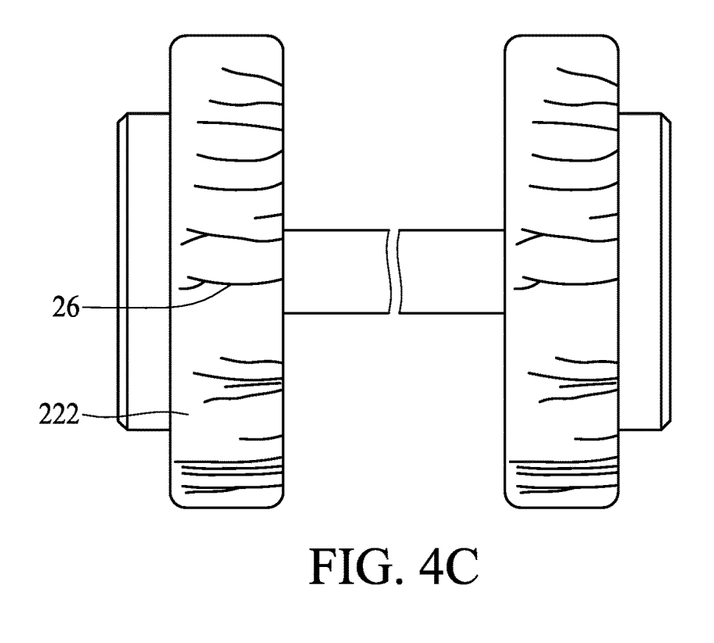
FIG. 4C illustrates a schematic view of a traveling wheel of a transport vehicle according to some embodiments of the present disclosure.
Figure 4D:
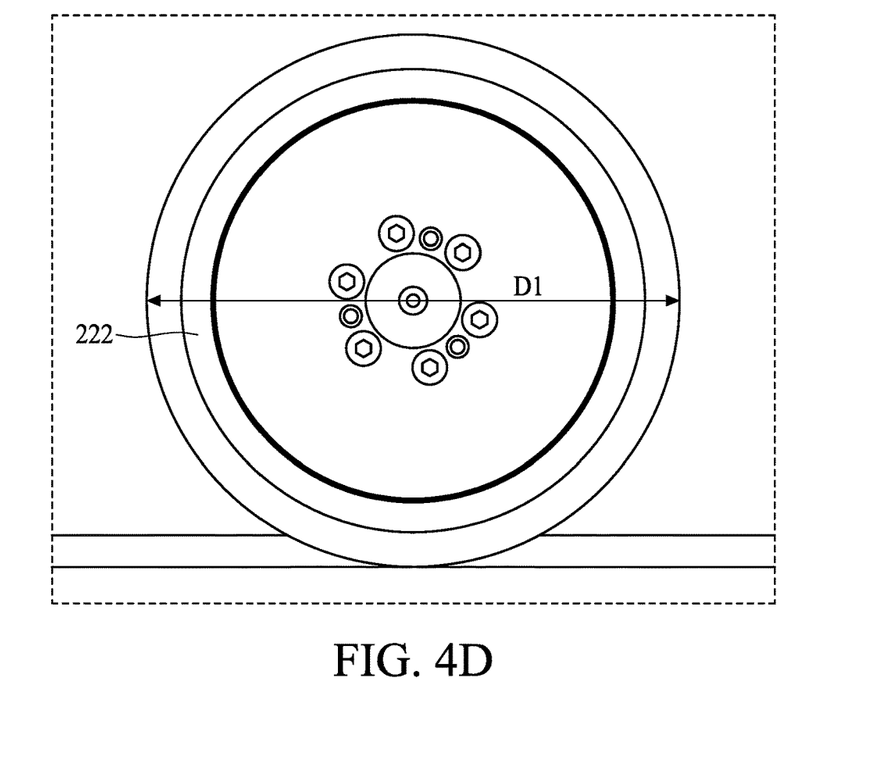
FIG. 4D illustrates a schematic side view of a traveling wheel of a transport vehicle according to some embodiments of the present disclosure.
Figure 4E:
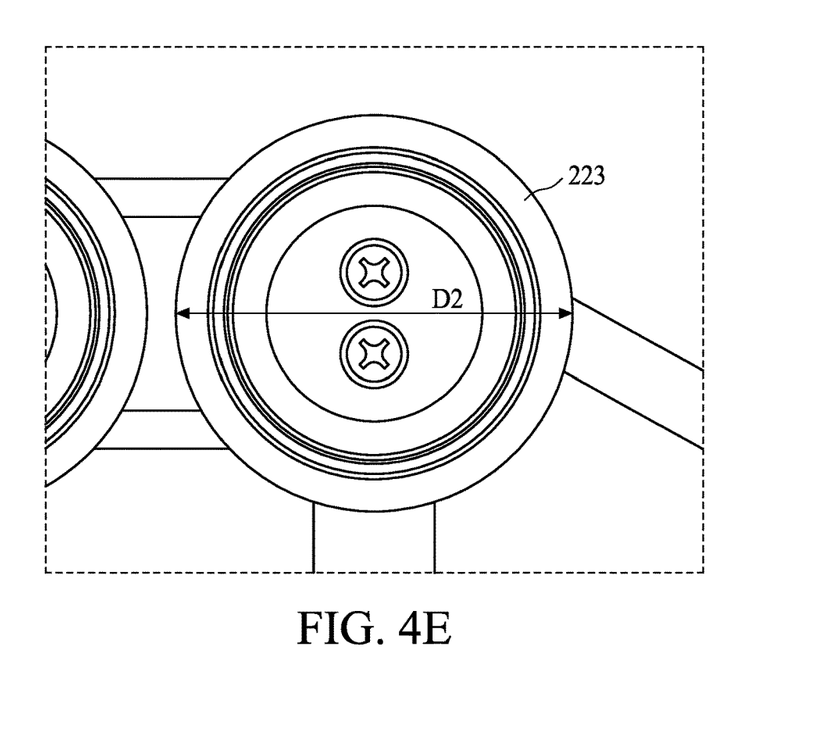
FIG. 4E illustrates a schematic top view of a guide wheel of a transport vehicle according to some embodiments of the present disclosure.
Figure 4F:
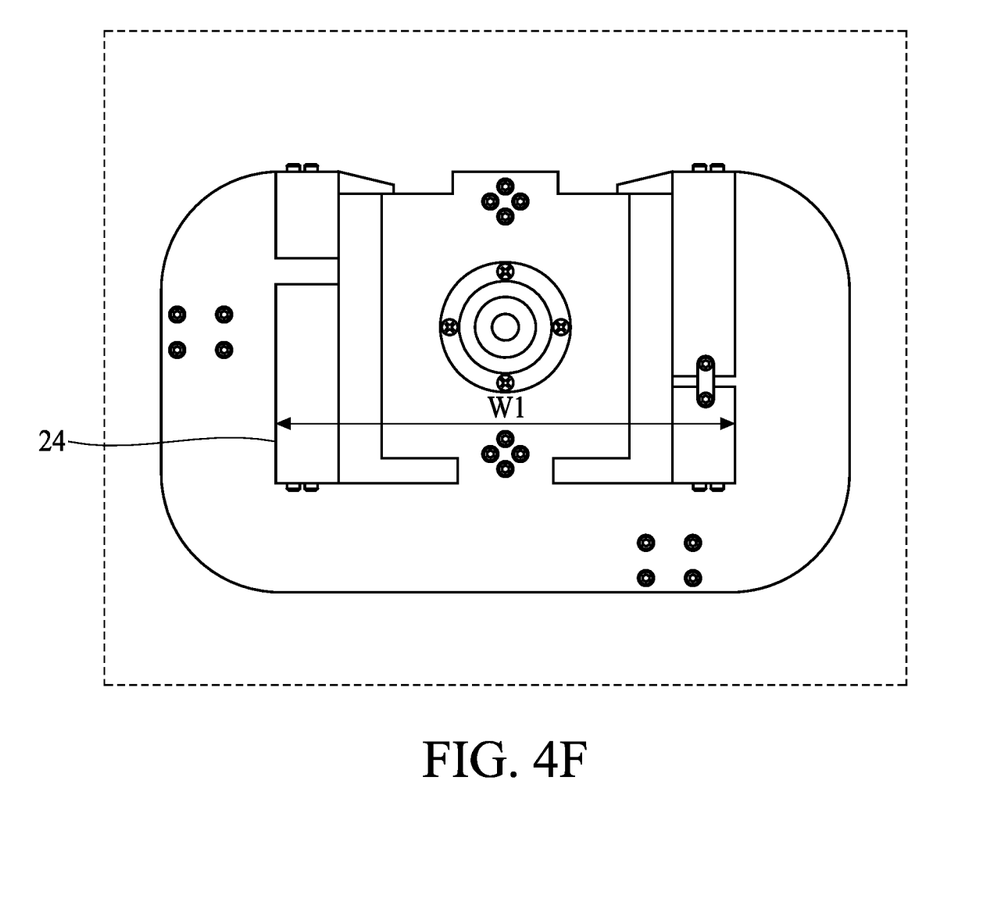
FIG. 4F illustrates a schematic bottom view of a gripping member of a transport vehicle according to some embodiments of the present disclosure.

Accordingly, in some embodiments, as shown in FIGS. 4B and 4C, the structural defects 25 in the main body profile (e.g., the surface of the housing 21) and the cracks 26 in the tyre tread profile (e.g., the surface of the traveling wheel 222) may be identified or detected by the monitoring system. Further, as shown in FIGS. 4D and 4E, the size of the traveling wheel 222 (e.g., the diameter D1) and the size of the guide wheel 223 (e.g., the diameter D2) may be measured by the monitoring system as well. In some embodiments, by positioning the monitor 30 below the transport vehicles 20 or below the rail 40, as shown in FIG. 4F, the gripping member 24 may be monitored and the width W1 of the gripping member 24 may thus be measured by the monitoring system.

The monitoring system may be implemented by using the monitors 30 as aforementioned. In some embodiments, the monitoring system includes a three dimensional laser measurement technique, such as including Time of Flight (ToF) camera that having a modulated light source such as a laser and a sensor that is sensitive to the laser's wavelength for capturing reflected light. In some embodiments, the monitor 30 may include camera configured to acquire Near Infrared (NIR) images or visible images to collect the surface features of the transport vehicles 20. In some embodiments, ultrasound technique may be applied for scanning as well. In some embodiments, the monitor 30 may be positioned in any direction of the monitored rail section, and therefore the transport vehicles 20 may be monitored substantially from all angles, depending on the environment of the factory. In some embodiments, each of the plurality of monitors 30 are utilized to monitor different perspectives of the transport vehicles 20 (e.g., the top view, the bottom view, the left view, the right view, and the like). In some embodiments, each of the plurality of monitors 30 are utilized to monitor different operation periods of the transport vehicles 20, such as when the transport vehicle 20 is moving, stopping, carrying up an object, or carrying down the object. In some embodiments, the object includes wafer front opening unified pod (FOUP), wafer standard mechanical interface (SMIF) pod, mask box, die carrier, or chip carrier, and the like.

Furthermore, as previously shown in FIGS. 3A to 3D, the rail system in the semiconductor manufacturing factory may include branches, merges, as well as curve segments. The positions of the monitors 30 may not be limited to the forms of the rail system. To be more precisely, each of the monitors 30 may need to spend some time on scanning the transport vehicle 20 passing nearby, depending on the form and efficiency of the monitor 30 and the travel speed of the transport vehicle 20. In some embodiments, the transport vehicle 20 may have a travel speed up to about 150 cm per second. In some embodiments, the transport vehicle 20 may have a travel distance in a range of from about 30 cm to about 40 cm during a single scanning operation, which is short enough for considering the forms of the rail system. In other words, the form of the rail system substantially has less influence on the consideration of the positions of the monitors 30.

By scanning the transport vehicles 20, the vehicle patterns of each of the transport vehicles 20 may be acquired. The scanned data (i.e., the vehicle patterns) may be recorded by a recording unit belonging to the monitor 30 or the monitor system, or recorded in cloud recording storage or the like, for further analyzing. In some embodiments, the vehicle patterns are used to identify abnormal transport vehicles. In order to identify whether the scanned transport vehicle is in a good condition or should be classified as an abnormal transport vehicle due to some abnormal patterns, some embodiments of the present disclosure compare the traveling wheel size, the guide wheel size, or the width of the gripping member 24 of the transport vehicle 20 with a corresponding desirable size or a corresponding desirable range of the transport vehicle 20. The comparison may be implemented by a computer electrically coupled to the monitor 30, the monitor system, the cloud recording storage, or any other devices for accessing the scanned data. In some embodiments, the comparison is based on the analysis of variance (ANOVA).

A desirable transport vehicle may have an intact main body; especially may have an intact housing 21 without any structural defects thereon. Accordingly, by comparing the main body profile of the scanned transport vehicle 20 to that of the desirable transport vehicle, the structural defects such as cracks, scratches, or even visible contaminant may be identified. In considering the cracks, scratches, contaminants, or the like, may be particle sources that may induce the loss of yield, the scanned transport vehicle is thus being identified as an abnormal transport vehicle. In some embodiments, the abnormal transport vehicle is moved out from the rail 40 in avoid of further contamination, or before the abnormal transport vehicle eventually malfunctioned due to the cracks or scratches.

Likewise, by comparing the tyre tread profile of the scanned transport vehicle to that of the desirable transport vehicle, the cracks caused by aging or some scuffs or abrasion may be identified. The cracked or scuffed tyre tread may affect the travel performance of the transport vehicle 20. For example, the transport vehicle 20 may travel along the rail under a shuddered condition due to the cracked or scuffed tyre, which may induce some particles in the transported FOUP drop on the waters therein. In other examples, the cracked or scuffed tyre may make the transport vehicle 20 tilted and thus may collide with other objects, or flat tyre is induced. In some embodiments, the transport vehicle 20 with disqualified tyre tread (i.e., including cracked or scuffed) may be identified as an abnormal transport vehicle and the identified abnormal transport vehicle is moved out from the rail 40 accordingly. As shown in FIG. 4C, in some embodiments, more cracks or scuffs can be found in proximity to the inner side of the traveling wheel 222.

In some embodiments, the sizes of the traveling wheels 222 and the guide wheels 223 may be measured by scanning and analyzing the transport vehicle 20. In some circumstances, the shapes of the traveling wheels 222 and the guide wheels 223 may be changed due to heavy loading or long time usage. For example, the diameters of the traveling wheels 222 and the guide wheels 223 may be changed. For example, each of the traveling wheels 222 used to have a diameter in a range of from about 124 mm to about 126 mm, but is changed to about 122 mm after a long time usage. In another example, each of the guide wheels 223 used to have a diameter in a range of from about 54 mm to about 56 mm, but is changed to about 52 mm after a long time usage. In some embodiments, the roundnesses of the traveling wheels 222 and the guide wheels 223 may be changed. Besides, the deceleration and the acceleration of the transport vehicle 20 in each operation period may also apply pressure on the traveling wheels 222. In some embodiments, the size of the traveling wheel 222 is changed due to the cracked or scuffed of the tyre of the traveling wheel 222. In some embodiments, the guide wheel 223 includes a bearing and the roundness of the guide wheel 223 may be changed because the bearing is damaged. In some embodiments, the poor roundness of the guide wheels 223 may produce abnormal dust due to abrasion. Therefore, some embodiments of the present disclosure also measure the sizes of the traveling wheels 222 and the guide wheels 223 to identify the abnormal transport vehicle and moved it out from the rail 40 accordingly. In some embodiments, the hoist wheel 232 may also be scanned and analyzed by the same way as well as that of the traveling wheels 222.

In some embodiments, the width of the gripping member 24 of the transport vehicle 20 may be measured by scanning and analyzing the transport vehicle 20. In some embodiments, the transport vehicle 20 may have a vacuum nozzle configured to suck a top portion of FOUP for fixing and positioning the FOUP within the housing 21 of the transport vehicle 20 for traveling. In the circumstances that the width W1 of the gripping member 24 is not wide enough during open configuration due to distortion, the FOUP cannot be fixed and positioned within the housing 21 of the transport vehicle 20, or in some embodiments the width W1 of the gripping member 24 is not narrow enough during closed configuration, the FOUP is easy to drop from the transport vehicle 20 and damage the wafers therein. For example, the width W1 of the gripping member 24 may be in a range of from about 164 mm to about 166 mm when the gripping member 24 is open, and may be in a range of from about 119 mm to about 121 mm when the gripping member 24 is closed, while an abnormal transport vehicle cannot provide such ranges correspondingly and thus be identified and moved out from the rail 40.

Figure 5:
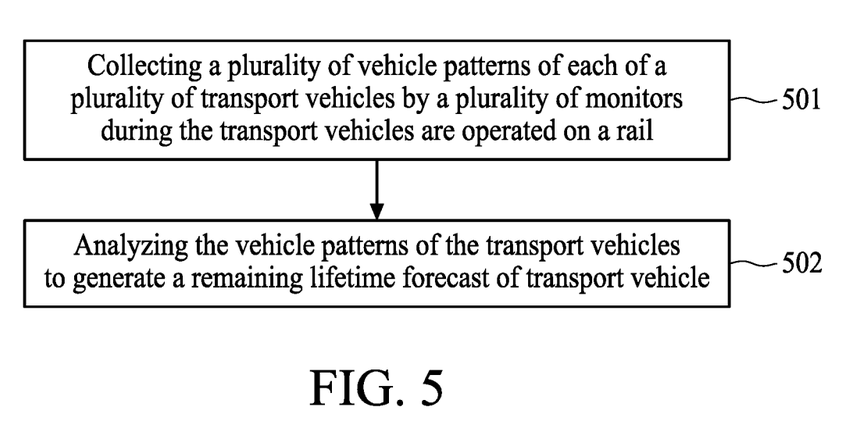
FIG. 5 illustrates a flow chart of monitoring transport vehicles according to some embodiments of the present disclosure.

In some embodiments, the vehicle patterns acquired from the scanned transport vehicles may further be used in building a forecast to estimate a remaining lifetime of the transport vehicles 20. FIG. 5 illustrates a flow chart of monitoring transport vehicles according to some embodiments of the present disclosure. In some embodiments, the method includes an operation 501: collecting a plurality of vehicle patterns of each of a plurality of transport vehicles by a plurality of monitors during the transport vehicles are operated on a rail; and an operation 502: analyzing the vehicle patterns of the transport vehicles to generate a remaining lifetime forecast of transport vehicle.

That is, some embodiments of the present disclosure may correlate the vehicle patterns and the operating statuses for generating the remaining lifetime forecast of the transport vehicles 20. In some embodiments, the operating statuses of each of the transport vehicles 20 may be collected, such as the total hours that the transport vehicle 20 operated on the rail 40, the total distance that the transport vehicle 20 traveled on the rail 40, the accumulated weight that the transport vehicle 20 loaded during the operation period, the time since the transport vehicle 20 did scheduled maintenance, and the like. Generally, the lifetime of the transport vehicle 20 may be shortened by the usage of the transport vehicle 20, particularly, under a heavy load. In other words, the lifetime of the transport vehicle 20 is shortened significantly at least while: (a) the more total hours operated, (b) the more total distance traveled, or (c) the more accumulated weight loaded. By collecting the vehicle patterns of the transport vehicles 20, the curve of the lifetime of the transport vehicle 20 may be calculated by statistics or through an intelligent engine that using machine learning technique, deep learning technique, big-data mining technique, neural network technique, and the like. Accordingly, in some embodiments, the remaining lifetime forecast may be generated by analyzing the vehicle patterns of the transport vehicles 20, and it is possible to estimate and identify a potential abnormal transport vehicle according to the remaining lifetime forecast.

In some embodiments, once a transport vehicle 20 is identified as a potential abnormal transport vehicle based on the remaining lifetime forecast, such potential abnormal transport vehicle may be moved out of the rail 40 for maintenance. In other words, in some embodiments, the maintenance schedule is optimized by the remaining lifetime forecast. In some embodiments, the maintenance of the transport vehicles 20 may be implemented based on the operating statuses only, without using monitors for acquiring the actual vehicle patterns such as the sizes of the wheels or the like. Accordingly, a potential failure part of the potential abnormal transport vehicle may be replaced timely. For example, the tyres of the transport vehicles 20 may be replaced reasonably by following the optimized maintenance schedule before it failed actually. In some embodiments, each of the parts (e.g., replaceable parts) of the transport vehicle 20 may have its own remaining lifetime and thus have its own maintenance schedule respectively.

Figure 6:
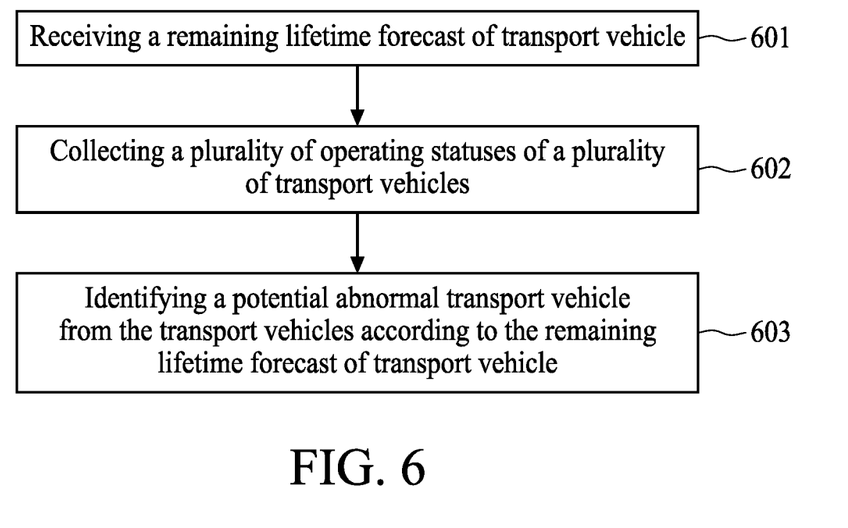
FIG. 6 illustrates a flow chart of monitoring transport vehicles according to some embodiments of the present disclosure.

Therefore, as shown in FIG. 6, in some embodiments, the method for transport vehicle maintenance includes an operation 601: receiving a remaining lifetime forecast of transport vehicle; an operation 602: collecting a plurality of operating statuses of a plurality of transport vehicles; and an operation 603: identifying a potential abnormal transport vehicle from the transport vehicles according to the remaining lifetime forecast of transport vehicle.

In some embodiments, the transport vehicles 20 are operating on the rail 40 when the potential abnormal transport vehicle is identified, and the potential abnormal transport vehicle is moved out from the rail 40 after being identified.

In some embodiments, the remaining lifetime forecast of the transport vehicles 20 may be updated in real time. In some embodiments, the remaining lifetime forecast of transport vehicle is updated by scanning the transport vehicles 20 and analyzing the vehicle patterns of the transport vehicles 20 repeatedly. For example, the remaining lifetime of a transport vehicle 20 may be shortened in a large scale once an abnormal vehicle pattern is monitored, such as cracks, scuffs, abrasion, distortions, etc., as aforementioned.

According to the present disclosure, a method for monitoring transport vehicle and maintenance thereof are disclosed. Overall, the disclosed method may diagnosis the conditions of the transport vehicles automatically under a rapid efficiency, and thus may improve the quality of the products. The method in the present disclosure may scan the transport vehicles by monitors during the transport vehicles are operated along the rail, and acquire enough vehicle patterns of each of the transport vehicles for further analysis accordingly. By analyzing the vehicle patterns, the abnormal transport vehicles may be identified from hundreds or thousands of transport vehicles operating in the factory. In some embodiments, by using the analysis result, the remaining lifetime forecast of transport vehicle may be generated to optimize the maintenance schedule of the transport vehicle, and the potential abnormal transport vehicles may be moved out from the rail before they are actually malfunctioned or damage or interrupt the process flow.

In one exemplary aspect, a method for monitoring a transport vehicle is provided. The method includes the operations as follows. A transport vehicle is scanned by a monitor during the transport vehicle is operated on a rail to acquire a vehicle pattern of the transport vehicle. The vehicle pattern of the transport vehicle is analyzed. An abnormal transport vehicle is determined based on the vehicle pattern. The monitor is placed nearby the rail.

In another exemplary aspect, a method for monitoring transport vehicle is provided. The method includes the operations as follows. A plurality of vehicle patterns of each of a plurality of transport vehicles are collected by a plurality of monitors during the transport vehicles are operated on a rail. The vehicle patterns of the transport vehicles are analyzed to generate a remaining lifetime forecast of transport vehicle. The monitors are placed nearby the rail.

In yet another exemplary aspect, a method for transport vehicle maintenance is provided. The method includes the operations as follows. A remaining lifetime forecast of transport vehicle is received. A plurality of operating statuses of a plurality of transport vehicles are collected. A potential abnormal transport vehicle is identified from the transport vehicles according to the remaining lifetime forecast of transport vehicle. The operating status includes a total hours of each of the transport vehicles operated on the rail, a total distance of each of the transport vehicles traveled on the rail, an accumulated weight of each of the transport vehicles loaded during an operation period, or a maintenance time of each of the transport vehicle.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for monitoring a transport vehicle, the method comprising:
   positioning a plurality of monitors nearby a rail in a semiconductor manufacturing factory, wherein at least one of the plurality of monitors is positioned under the rail, and the plurality of monitors are fixed nearby the rail and are separated from the transport vehicle;
   performing a plurality of scanning operations to scan surface features of the transport vehicle by the plurality of monitors when the transport vehicle is lifting up an object or lowering the object by the monitor disposed between the rail and the transport vehicle when the transport vehicle passes through to acquire a vehicle pattern of the transport vehicle, wherein the transport vehicle comprises:
      a gripping member;
      a hoisting member configured to lift and lower the object from and to a load port of a semiconductor process machine station by the gripping member; and
      a housing surrounding the gripping member and the hoisting member;
   analyzing the vehicle pattern of the transport vehicle; and
   determining if the transport vehicle is an abnormal transport vehicle based on the vehicle pattern, wherein the determination includes:
      identifying a particle source from the vehicle pattern of the transport vehicle, and
      identifying the abnormal transport vehicle through comparing a width of the gripping member of the transport vehicle from the vehicle pattern acquired by the monitor positioned under the rail and disposed between the rail and the transport vehicle to a corresponding desirable width of the gripping member of the transport vehicle,
   wherein the particle source comprises crack or scratch of a surface of the housing.

2. The method of claim 1, further comprising:
   moving the abnormal transport vehicle out of the rail.

3. The method of claim 1, wherein the vehicle pattern further comprises a serial number, a main body profile, a tyre tread profile, a travelling wheel size, and a guide wheel size of the transport vehicle.

4. The method of claim 1, wherein the object comprises semiconductor wafers, semiconductor work-in-process (WIP) parts, semiconductor substrates, semiconductor structures, or semiconductor packages.

5. The method of claim 1, wherein the hoisting member is extendable to move the gripping member out of the housing and retractable to move the gripping member back to the housing.

6. The method of claim 1, wherein the corresponding desirable width of the gripping member of the transport vehicle comprises a first width range when the gripping member is open, and a second width range when the gripping member is closed, and the width of the gripping member of the abnormal transport vehicle acquired by the monitor positioned under the rail and disposed between the rail and the transport vehicle is free from within the first width range and the second width range.

7. The method of claim 1, wherein each of the monitors and the rail are stationary relative to the transport vehicle when the transport vehicle is traveled on the rail.

8. The method of claim 1, wherein the monitor positioned under the rail is configured to acquire a bottom view of the gripping member from a distance below a bottom of the transport vehicle.

9. The method of claim 1, wherein the plurality of monitors are positioned to acquire a top view, a bottom view, a left view, and a right view of the transport vehicle.

10. A method for monitoring transport vehicles, the method comprising:
    positioning a plurality of monitors nearby a rail in a semiconductor manufacturing factory, wherein at least one of the plurality of monitors is positioned under the rail, and the plurality of monitors are fixed nearby the rail and are separated from the transport vehicles;
    collecting a plurality of vehicle patterns of each of the plurality of transport vehicles by scanning surface features of the transport vehicles through the plurality of monitors when the transport vehicles are lifting up an object or lowering the object by each of the monitors disposed between the rail and the transport vehicle when the transport vehicle passes through, wherein each of the transport vehicles comprises:
       a gripping member;
       a hoisting member configured to lift and lower the object from and to a load port of a semiconductor process machine station by the gripping member; and
       a housing surrounding the gripping member and the hoisting member;
    analyzing the vehicle patterns of the transport vehicles to generate a remaining lifetime forecast of transport vehicle; and
    determining a potential abnormal transport vehicle according to the remaining lifetime forecast of transport vehicle, wherein the determination includes:
       identifying a particle source from the vehicle patterns of the transport vehicles, and
       identifying the potential abnormal transport vehicle through comparing a width of the gripping member of the transport vehicles from the vehicle patterns acquired by the monitor positioned under the rail and disposed between the rail and the transport vehicle to a corresponding desirable width of the gripping member of the transport vehicles,
    wherein the particle source comprises crack or scratch of a surface of the housing, and
    wherein the object is held by the gripping member during the collection of the vehicle patterns, and the corresponding desirable width of the gripping member of the transport vehicle comprises a first width range when the gripping member is open, and a second width range when the gripping member is closed, and the width of the gripping member of the abnormal transport vehicle acquired by the monitor positioned under the rail and disposed between the rail and the transport vehicle is out of the first width range and the second width range.

11. The method of claim 10, further comprising:
    moving the potential abnormal transport vehicle out of the rail.

12. The method of claim 11, further comprising:
    collecting a plurality of operating statuses of each of the transport vehicles;
    wherein the operating status comprises a total hours of each of the transport vehicles operated on the rail, a total distance of each of the transport vehicles traveled on the rail, an accumulated weight of each of the transport vehicles loaded during an operation period, or a maintenance time of each of the transport vehicles.

13. The method of claim 12, wherein the remaining lifetime forecast is generated by a correlation between the vehicle patterns and the operating statuses.

14. The method of claim 11, further comprising:
generating a maintenance schedule according to the remaining lifetime forecast of transport vehicle to replace a potential failure part of the potential abnormal transport vehicle.

15. The method of claim 10, wherein the potential abnormal transport vehicle comprises a travelling wheel size, a guide wheel size, or the width of the gripping member of the transport vehicle different from a corresponding desirable size of the transport vehicle.

16. A method for transport vehicle maintenance, the method comprising:
receiving a remaining lifetime forecast of transport vehicle transporting in a semiconductor manufacturing factory;
collecting a plurality of operating statuses of a plurality of transport vehicles by scanning the transport vehicles through a plurality of monitors positioned nearby a rail in the semiconductor manufacturing factory when each of the transport vehicles is lifting up an object or lowering the object by the monitors disposed between the rail and the transport vehicle when the transport vehicle passes through, wherein at least one of the monitors is positioned under the rail, and the plurality of monitors are fixed nearby the rail, are separated from the transport vehicles, and are stationary relative to the transport vehicle when the transport vehicle is traveled on the rail, and wherein each of the transport vehicles comprises:
a gripping member;
a hoisting member configured to lift and lower the object from and to a load port of a semiconductor process machine station by the gripping member; and
a housing surrounding the gripping member and the hoisting member; and
determining a potential abnormal transport vehicle from the transport vehicles according to the remaining lifetime forecast of transport vehicle, wherein the determination includes:
identifying a particle source from the potential abnormal transport vehicle, and
identifying the potential abnormal transport vehicle through comparing a width of the gripping member of each of the transport vehicles acquired by the monitor positioned under the rail and disposed between the rail and the transport vehicle to a corresponding desirable width of the gripping member of the transport vehicles;
wherein the operating status comprises a total hours of each of the transport vehicles operated on the rail, a total distance of each of the transport vehicles traveled on the rail, an accumulated weight of each of the transport vehicles loaded during an operation period, or a maintenance time of each of the transport vehicles, and
wherein the particle source comprises crack or scratch of a surface of the housing.

17. The method of claim 16, wherein the remaining lifetime forecast is generated by:
scanning the transport vehicles by the plurality of monitors to acquire a plurality of vehicle patterns of each of the transport vehicles; and
analyzing the vehicle patterns of the transport vehicles to generate the remaining lifetime forecast of transport vehicle.

18. The method of claim 17, further comprising:
updating the remaining lifetime forecast of transport vehicle by scanning the transport vehicles and analyzing the vehicle patterns of the transport vehicles repeatedly.

19. The method of claim 16, wherein the remaining lifetime forecast of transport vehicle comprises a plurality of remaining lifetimes corresponding to each of a plurality of parts of the transport vehicle.

20. The method of claim 16, wherein the transport vehicles are operating on the rail when the potential abnormal transport vehicle is identified, and the potential abnormal transport vehicle is moved out from the rail after being identified.

* * * * *